(12) United States Patent
Bhat et al.

(10) Patent No.: US 9,362,990 B1
(45) Date of Patent: Jun. 7, 2016

(54) METHOD AND APPARATUS FOR PRECOMPUTATION BASED MIMO DECODER

(71) Applicant: MBIT WIRELESS, INC., Newport Beach, CA (US)

(72) Inventors: Raghavendra H Bhat, Bangalore (IN); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 14/740,645

(22) Filed: Jun. 16, 2015

(51) Int. Cl.
*H04B 7/02* (2006.01)
*H04B 7/04* (2006.01)
*H04W 88/08* (2009.01)

(52) U.S. Cl.
CPC ............. *H04B 7/0413* (2013.01); *H04W 88/08* (2013.01)

(58) Field of Classification Search
CPC .............................. H04B 7/0413; H04W 88/08
See application file for complete search history.

(56) References Cited

U.S. PATENT DOCUMENTS

| | | | | |
|---|---|---|---|---|
| 7,017,104 B1* | 3/2006 | Chen | ......................... | H04L 1/20 375/235 |
| 2006/0104390 A1* | 5/2006 | Graef | ................ | H04L 25/03191 375/341 |
| 2008/0298491 A1* | 12/2008 | Jung | .................... | H04L 25/0206 375/260 |
| 2009/0063106 A1* | 3/2009 | Burg | ...................... | H04L 1/0656 703/2 |
| 2010/0157785 A1* | 6/2010 | Song | ................. | H04L 25/03203 370/203 |
| 2014/0056389 A1* | 2/2014 | Lee | .......................... | H04B 7/08 375/341 |
| 2014/0153625 A1* | 6/2014 | Vojcic | ..................... | H04L 1/005 375/224 |

\* cited by examiner

*Primary Examiner* — Syed Haider
(74) *Attorney, Agent, or Firm* — Lerner, David, Littenberg, Krumholz & Mentlik, LLP

(57) ABSTRACT

Spatial Multiplexing (SM) with Multiple Input Multiple Output (MIMO) is used in many communication systems for providing high data rates. While SM-MIMO is a powerful technique for increasing the data rate and bandwidth efficiency, the decoders for SM-MIMO are highly complex. The complexity grows exponentially for optimum decoders as the number of multiplexed layers in SM-MIMO increases. Many reduced complexity suboptimal methods are used in practice that have close to optimum performance but they remain highly complex causing high power consumption which is not desirable for battery operated client terminals. Due to the parallel architecture of many of the SM-MIMO decoders, they involve computations that may eventually turn out to be redundant. A method and apparatus may include identifying and eliminating potentially redundant computations in SM-MIMO decoders based on the technique referred herein as precomputation. The removal of redundant computations enables reduced power consumption for SM-MIMO decoders.

21 Claims, 13 Drawing Sheets

FIG. 4
(Prior Art)

METHOD AND APPARATUS FOR PRECOMPUTATION BASED MIMO DECODER

BACKGROUND

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. The terms base station and a cell may be used interchangeably herein. In general, the cells that are in the vicinity of the serving cell are called neighbor cells. Similarly, in some wireless communication systems a neighbor base station is normally referred as a neighbor cell.

Multiple transmit and/or receive chains are commonly used in many wireless communication systems for different purposes. Multiple transmit and/or receive chains in wireless communication systems offer spatial dimension that can be exploited in the design of wireless communication systems. Communication systems with multiple transmit and/or receive chains offer improved performance. The performance improvement can be in terms of better coverage, higher data rates, reduced Signal to Noise Ratio (SNR) requirements, multiplexing of multiple users on the same channel at the same time, or some combination of the above. Different techniques using multiple receive and/or transmit chains are often referred to with different names such as diversity combining (maximum ratio combining, equal gain combining, selection combining, etc.), space-time coding (STC) or space-time block coding (STBC), spatial multiplexing (SM), beamforming and multiple input multiple output (MIMO). Normally wireless communication systems with multiple transmit chains at the transmit entity and multiple receive chains at the receive entity are referred to as MIMO systems. The aspects of the present invention apply to Spatial Multiplexing MIMO systems, i.e., wireless communication systems that use the Spatial Multiplexing technique using multiple transmit chains at the transmit entity and multiple receive chains at the receive entity.

In Spatial Multiplexing, a high data rate signal is split into multiple lower data rate streams and all the lower data rate streams are transmitted, with suitable precoding, simultaneously from all the available transmit antennas on the same frequency at the same time. Alternatively, data from two different users or applications may be transmitted simultaneously from all the available transmit antennas on the same frequency at the same time. If signals from different transmit antennas arrive at the receiver antennas through sufficiently different spatial propagation paths, the receiver may be able to separate these streams of data, creating parallel channels on the same frequency at the same time. SM is a powerful technique for increasing channel capacity at higher SNR. The maximum number of spatially multiplexed data streams is limited by the minimum of the number of antennas at the transmit entity and the number of antennas at the receive entity. For example, if the number of transmit antennas at the transmit entity is four and the number of receive antennas at the receive entity is two, the maximum number of spatially separable data streams is two.

FIG. 2 illustrates an example of an SM-MIMO wireless communication system with four transmit chains at the transmit entity, for example the base station, and four receive chains at the receive entity, for example the client terminal.

The signal from a transmit chain arrives at all four receive chains through different propagation paths as shown in the FIG. 2. The received signal at each receive chain may be a combination of signals transmitted from all four transmit chains and the noise as shown in FIG. 2.

The following notation is used in describing various signals in the remainder of the document. A subscript to a signal name denotes transmit or receive chain number to which the signal is associated. When there are two subscripts to a signal name, the first subscript refers to the transmit chain and the second subscript refers to the receive chain to which the signal is associated. Let $N_t$ denote the number of transmit chains and $N_r$ denote the number of receive chains. For SM the number of parallel data streams that can be supported is equal to the minimum of the number of transmit antennas $N_t$ and the number of receive antennas $N_r$. Normally a wireless communication system with $N_t$ transmit chains at the transmit entity and $N_r$ receive chains at the receive entity is referred as $N_t \times N_r$ MIMO communication system.

Wireless communication systems use different modulation techniques such as Quadrature Phase Shift Keying (QPSK), 16-Quadrature Amplitude Modulation (QAM), 64-QAM, etc. FIG. 3 illustrates a 16-QAM constellation and FIG. 4 illustrates a 64-QAM constellation. The set of all symbols in a given modulation technique is referred as constellation or alphabet. Let the total number of symbols in a constellation be denoted by L and the set of all symbols $a_k$ of a constellation be denoted by $A=\{a_k, \forall k=0, 1, 2, \ldots, L-1\}$. At a given instant, one symbol that represents the input data at the modulator is selected from the constellation for transmission.

Let the transmitted symbol at a given instant of time from the $i^{th}$ transmit chain be denoted by $s_i$ for $1=0, 1, \ldots, (N_t-1)$. Let the received symbol at a given instant of time at the $j^{th}$ receive chain be denoted by $x_j$ for $j=0, 1, \ldots, (N_r-1)$. Let the noise at a given instant of time at the $j^{th}$ receive chain be denoted by $n_j$ for $j=0, 1, \ldots, (N_r-1)$. The symbols $s_1$ used for transmission may be one of the symbols from the constellation of a selected modulation technique at the transmit entity.

Let channel conditions between transmit antenna i and receive antenna j be denoted by for $h_{i,j}=0, 1, \ldots, (N_t-1)$ and $j=0, 1, \ldots, (N_r-1)$. Mathematically, the relationship between the transmitted symbols, the channel conditions, the noise and the received symbols can be expressed as follows for the case of a wireless communication system with four transmit chains and four receive chains:

$$x_0 = h_{0,0}s_0 + h_{1,0}s_1 + h_{2,0}s_2 + h_{3,0}s_3 + n_0 \tag{1}$$

$$x_1 = h_{0,1}s_0 + h_{1,1}s_1 + h_{2,1}s_2 + h_{3,1}s_3 + n_1 \tag{2}$$

$$x_2 = h_{0,2}s_0 + h_{1,2}s_1 + h_{2,2}s_2 + h_{3,2}s_3 + n_2 \quad (3)$$

$$x_3 = h_{0,3}s_0 + h_{1,3}s_1 + h_{2,3}s_2 + h_{3,3}s_3 + n_3 \quad (4)$$

In matrix notation, for the case of $N_t$ transmit chains and $N_r$ receive chains $$s = [s_0, s_1, \ldots, s_{N_t-1}]^T \quad (5)$$

$$x = [x_0, x_1, \ldots, x_{N_r-1}]^T \quad (6)$$

$$n = [n_0, n_1, \ldots, n_{N_r-1}]^T \quad (7)$$

$$H = \begin{bmatrix} h_{0,0} & h_{1,0} & \cdots & h_{N_t-1,0} \\ h_{0,1} & h_{1,1} & & h_{N_t-1,1} \\ \vdots & & \ddots & \vdots \\ h_{0,N_r-1} & h_{1,N_r-1} & \cdots & h_{N_t-1,N_r-1} \end{bmatrix} \quad (8)$$

$$x = Hs + n \quad (9)$$

In EQ. (9), s is the transmitted symbols vector, H is the channel matrix, n is noise vector and x is the received signal vector.

Normally, the receiver of the wireless communication system needs to estimate the channel conditions to process the received signals. It is understood that the receiver obtains the required estimates of the channel conditions through techniques known in literature or through some other techniques. Let the estimated channel conditions between transmit antenna i and receive antenna j be denoted by $\hat{h}_{i,j}$, for i=0, 1, ..., ($N_t$−1) and j=0, 1, ..., ($N_r$−1) and let Ĥ denote the matrix of estimated channel conditions.

At the receive entity, the received symbols vector x is known. The channel conditions matrix H may be approximated by the estimated channel conditions matrix Ĥ. Based on these two known matrices, the transmitted symbols vector s may be estimated as ŝ by solving the linear system of equations in EQ. 9.

The system of equations represented by EQ. 9 needs to be solved at a rate proportional to the data rate of the wireless communication system. Normally SM-MIMO is used to achieve high data rate in wireless communication systems. Hence the system of equations represented in EQ. 9 needs to be solved at a faster rate. For example, in a broadband wireless communication system that offers data rate of 16 megabit per second over the air using 4×4 SM-MIMO with 16-QAM, EQ. 9 needs to be solved about one million times per second. Therefore, in general the complexity of the SM decoder is high. Further, the complexity of SM decoder normally grows exponentially as a function of the number of transmit chains and receive chains. Therefore, it is crucial to solve the system of equations represented by EQ. 9 in an efficient manner so that the wireless communication system can operate in real time with less processing resources and consumes less power.

Different optimal and sub-optimal decoders are described in the literature to solve the system of equations represented by EQ. 9. The Maximum Likelihood Decoder (MLD) is an optimal decoder for SM. Although MLD provides, theoretically, a best achievable decoding performance, its complexity and processing requirements are normally very high even for the common MIMO wireless communication systems such as 2×2 or 4×4 SM MIMO with 16-QAM or 64-QAM.

QR Decomposition (QRD) in conjunction with M-algorithm, referred as QRD-M decoder and also called QRD-M method, is one of the commonly used sub-optimal SM decoders. QRD-M sub-optimal SM decoder provides decoding performance close to that of the optimal SM decoder such as MLD, but requires reduced complexity and processing requirements. The reduced complexity and reduced processing requirements of QRD-M sub-optimal SM decoder makes it better suited for practical implementation. The QRD-M decoder used for SM is referred herein as QRD-M SM decoder.

Although the sub-optimal decoders are less complex and require less processing when compared to the optimal decoders, the complexity of the sub-optimal decoders still remain high. Therefore, it is desirable to further reduce the complexity of the sub-optimal decoders. Reduction in complexity results in less resource requirements and reduced power consumption. Since the decoding operations are performed at a very high rate such as millions of times per second, any reduction in processing requirements leads to significant reduction in power consumption, latency and/or increase in throughput.

The conventional QRD-M SM decoder consists of two main processing blocks as shown in FIG. 5. The first main processing block is the QR decomposition followed by matrix multiplication and the second main processing block is the M-algorithm. The QR decomposition block decomposes the channel matrix H into a right triangular matrix R and a unitary matrix Q using QR matrix decomposition method. Specifically, $$H = QR \quad (10)$$

Since R is a right triangular matrix, all its elements below the main diagonal are zero. A property of a unitary matrix is that its inverse can be obtained by its Hermitian transpose. Specifically, $$Q^{-1} = Q^H \quad (11)$$

Therefore, $$Q^H Q = I \quad (12)$$

where I is an identity matrix. The Hermitian transpose of a unitary matrix is also a unitary matrix. Also when a vector is multiplied by a unitary matrix, the magnitude of the vector does not change. The unitary matrix Q is in general WG matrix. A discussion of the fundamentals of matrix computations may be found in the text entitled Matrix Computations, The Johns Hopkins University Press, 2nd Ed., 1989, by G. H. Golub and C. F. Van Loan, the entire disclosure of which is hereby expressly incorporated by reference herein.

Substituting H from EQ. 10 in the expression for the received signal vector represented by EQ. 9:

$$x = QRs + n \quad (13)$$

Pre-multiplying both sides with $Q^H$, $$Q^H x = y = Q^H QRs + Q^H n = Rs + w \quad (14)$$

where y is the rotated received signal vector x and w is the rotated noise vector n. Then EQ. 14 becomes $$y = Rs + w \quad (15)$$

For the case of 4×4 SM-MIMO, the expanded version of EQ. 15 is as follows:

$$\begin{bmatrix} y_0 \\ y_1 \\ y_2 \\ y_3 \end{bmatrix} = \begin{bmatrix} r_{0,0} & r_{1,0} & r_{2,0} & r_{3,0} \\ 0 & r_{1,1} & r_{2,1} & r_{3,1} \\ 0 & 0 & r_{2,2} & r_{3,2} \\ 0 & 0 & 0 & r_{3,3} \end{bmatrix} \begin{bmatrix} s_0 \\ s_1 \\ s_2 \\ s_3 \end{bmatrix} + \begin{bmatrix} w_0 \\ w_1 \\ w_2 \\ w_3 \end{bmatrix} \quad (16)$$

In case the number of receive chains at the receive entity is greater than the number of transmit chains at the transmit entity, all the elements in the bottom $N_r-N_t$ rows of the right triangular matrix R are zero and the bottom $N_r-N_t$ rows of the column vector y are also zero after QR decomposition. Therefore, the system of equations represented by EQ. 15 is simplified to $N_t \times N_t$ system of linear equations. In the remainder of this disclosure, the R matrix is considered to be an $N_t \times N_t$ matrix.

The second main processing block of the QRD-M SM decoder, namely M-algorithm, is described next. The solution of the system of equations represented in EQ. 15 using M-algorithm may be obtained in several stages. The number of stages in the M-algorithm corresponds to the number of rows in the system of equations and the M-algorithm is applied sequentially to each stage. The value of M in the M-algorithm refers to the number of best symbol sequences used for further consideration in a sequential decoding process. The best symbol sequences are the symbol sequences from the constellation selected based on minimum distance metrics. The M-algorithm for each stage includes two major processing steps. First, it computes all the distance metrics for a given stage. Next it selects M best symbol sequences for the next stage of processing. The selected M best symbol sequences are referred as surviving symbol sequences for the next stage. This process continues for all stages and at the last stage one best symbol sequence is selected as the decoded symbols vector ŝ. A 4×4 SM-MIMO wireless communication system, as represented in EQ. 16, using 16-QAM is chosen to illustrate the M-algorithm. For the chosen example, as represented in EQ. 16, the number of stages for M-algorithm is four. In QRD-M SM decoder, the M-algorithm starts by first operating on the bottom-most row corresponding to a single non-zero element in the R matrix. For the chosen example, as represented in EQ. 16, the M-algorithm starts with the fourth row containing the single non-zero element $r_{3,3}$ in matrix R.

To solve the equation represented by the bottom-most row containing a single non zero element, all possible values for $s_{(N_t-1)}$ from the constellation alphabet A used by the transmit entity may be multiplied with element $r_{(N_t-1),(N_t-1)}$ of matrix R and subtracted from element $y_{(N_t-1)}$ of vector y to compute the distance metrics $d_{(N_t-1)}$ for all possible values of $s_{(N_t-1)}$. For the chosen example, as represented in EQ. 16, to solve the equation represented by the fourth row containing a single non zero element $r_{3,3}$, all possible values for $s_3$ from the constellation alphabet A used by the transmit entity may be multiplied with $r_{3,3}$ and subtracted from $y_3$ to compute the distance metrics $d_3$ for all possible values of $s_3$. For the chosen example, as represented in EQ. 16, with 16-QAM used by the transmit entity, the number of distance metric computations at the receive entity for the fourth row is 16, corresponding to 16 possible values for $s_3$.

For the chosen example, as represented in EQ. 16, M is used for the M-algorithm. For the chosen example, as represented in EQ. 16, this results in the selection of 8 best symbol sequences with minimum distance metrics from the total of distance metrics corresponding to L=16 symbol sequences. These selected 8 (M=8) symbol sequences are referred as surviving symbol sequences. At the first stage, the symbol sequences of length one and at the subsequent stages the symbol sequences grow by one symbol in length at each stage as the stages progress.

Next, the M-algorithm enters the second stage of processing. In the second stage of processing, the M-algorithm operates on row $(N_t-2)$. For the chosen example, as represented in EQ. 16, the M-algorithm operates on the third row which is immediately above the fourth row. At the second stage of M-algorithm, there are 16 possible values for $s_2$ and 8 selected surviving symbol sequences from the previous stage. This requires 16×8=128 total number of distance metric computations corresponding to 128 different combinations of $s_2$ and $s_3$. The distance metrics computed in the second stage are cumulative distance metrics corresponding to the distance metric of a symbol sequence $(s_2, s_3)$ and the distance metric of the selected surviving symbol sequences for $s_3$ during the first stage. The M-algorithm then selects 8 best surviving symbol sequences corresponding to the minimum cumulative distance metrics. The surviving symbol sequences are of length two at this stage.

Next, the M-algorithm enters the third stage of processing. In the third stage of processing, the M-algorithm operates on row $(N_t-3)$. For the chosen example, as represented in EQ. 16, the M-algorithm operates on the second row which is immediately above the third row. At the third stage of M-algorithm, there are 16 possible values for $s_1$ and 8 selected surviving symbol sequences from the previous stage. This requires 16×8=128 total number of distance metric computations corresponding to 128 different combinations of $s_1$, $s_2$ and $s_3$. The distance metrics computed in the third stage are the cumulative distance metrics corresponding to the distance metric of a symbol sequence $(s_1, s_2, s_3)$ and the distance metric of the selected surviving symbol sequence for $(s_2, s_3)$ during the second stage. Next, the M-algorithm selects 8 best surviving symbol sequences corresponding to the minimum cumulative distance metrics. The surviving symbol sequences are of length three at this stage.

This process continues for each stage until the last stage, which corresponds to the first row of EQ. 16 is reached. After computing the cumulative distance metrics for the last stage, one best surviving symbol sequence is selected as the decoded symbols vector ŝ. In case where the decoding is successful the decoded symbols vector is equal to the transmitted symbols vector, i.e., ŝ=S. For the chosen example, as represented in EQ. 16, at the last stage the M-algorithm operates on the first row. Therefore, at the last stage of the M-algorithm, there are 16 possible values for $s_0$ and 8 selected surviving symbol sequences from previous stage. This requires 16×8=128 total number of distance metric computations corresponding to 128 different combinations of $s_0$, $s_1$, $s_2$ and $s_3$. The distance metrics computed in the last stage are the cumulative distance metrics corresponding to the distance metric of a symbol sequence $(s_0, s_1, s_2, s_3)$ and the distance metric of the selected surviving symbol sequence $(s_1, s_2, s_3)$ during the third stage. Next, the M-algorithm selects one best surviving symbol sequence $\hat{s}=[\hat{s}_0, \hat{s}_1, \hat{s}_2, \hat{s}_3]^T$ corresponding to the minimum cumulative distance metric. FIG. 6 shows the general processing flow diagram of the M-algorithm for $N_t$ stages.

The value of M may be chosen according to the required decoding performance and processing complexity tradeoff. The smaller the value of M, the lesser the complexity and processing requirements, which may lead to reduction in power consumption.

However, a smaller value of M also reduces the decoding performance.

Two major areas of complexity in the M-algorithm for each stage are: the computation of distance metrics and selection of best surviving symbol sequences corresponding to the minimum distance metrics. The computation of distance metrics in general may require complex multiplications. Since there may be hundreds of distance metric computations for one pass of QRD-M SM decoder, the number of required complex multiplications is generally high.

In general, when using an $N_t \times N_r$ SM, there will be $N_t$ processing stages in the M-algorithm of the QRD-M SM decoder. If a modulation scheme with constellation size L is used by the transmit entity, then the following distance metrics computations may be performed by a traditional M-algorithm:

For the first stage: L distance metric computations over symbol sequences consisting of length one.

For the second stage: M×L distance metric computations over symbol sequences consisting of length two.

For the third stage: M×L distance metric computations over symbol sequences consisting of length three.

For the $N_t$-th stage: M×L distance metric computations over symbol sequences consisting of length $N_t$.

In addition to the distance metric computations, the selection operations may be performed based on minimum distance metrics at each stage.

Precomputation logic is a sequential logic optimization method used to reduce power consumption at logic level. The key optimization step is the synthesis of the precomputation logic, which computes the output values of a logic circuit at least one clock cycle before they are required.

If the output values of the original logic circuit can be precomputed using the precomputation logic for a subset of input conditions, the original logic circuit may be turned off and thus may not have any internal switching activity in the succeeding clock cycle.

A precomputation architecture is shown in FIGS. 7(a) and 7(b). FIG. 7(a) shows the original logic without any precomputation where the inputs are registered using R1, the block implements logic A, and output is registered using R2. For illustration purposes it is assumed that there are n inputs namely $x_1, x_2, \ldots, x_n$ to the logic block and a single output f. FIG. 7(b) shows the same logic as in FIG. 7(a) but enhanced with the precomputation logic. It defines two Boolean predictor functions $g_1$ and $g_2$ satisfying the following conditions:

$$g_1 = 1 \rightarrow f = 1 \quad (17)$$

$$g_2 = 1 \rightarrow f = 0 \quad (18)$$

During a clock cycle t if either $g_1$ or $g_2$ evaluates to a 1, the Latch Enable (LE) signal of the register R1 is set to be 0. This means that in clock cycle t+1 the inputs to the combinational logic block A do not change. If $g_1$ evaluates to a 1 in clock cycle t, the input to register R2 is a 1 in clock cycle t+1, and if $g_2$ evaluates to a 1, then the input to register R2 is a 0. Note that $g_1$ and $g_2$ cannot both be 1 during the same clock cycle due to the conditions imposed by EQ. 17 and EQ. 18.

For a subset of input conditions corresponding to ($g_1 + g_2$), the inputs to block A do not change thereby implying zero switching activity resulting in power reduction. The power reduction is achieved by additional logic corresponding to functions $g_1$ and $g_2$ and few additional gates. The precomputation logic functions $g_1$ and $g_2$ add to the critical path delay that end at register R1. In general, the functions $g_1$ and $g_2$ may be chosen such that the increase in additional logic is acceptable and the additional delay included does not affect the critical paths of the design. A power reduction in logic block A is obtained because for a subset of input conditions corresponding to $g_1 + g_2$, the inputs to logic block A do not change which may lead to no switching activity in the subsequent part of the circuit.

BRIEF SUMMARY

In accordance with an aspect of the present invention, a method for multiple input multiple output (MIMO) decoding may include controlling, by a processing device, determining of a minimum cumulative distance metric for decoding a symbol used in MIMO wireless communication. The determining may have a first stage and a second stage and includes: combining a first predictor function ($g_1$) with a second predictor function ($g_2$) using a first logical AND operation to obtain an output (g), combining the output (g) which is inverted, with an output of an input validity register to which a signal indicating validity of input is supplied, using a second logical AND operation to obtain a control signal, and controlling first and second registers, which are supplied, respectively, with first and second outputs from the first stage, with the control signal, such that third and fourth outputs respectively of the first and second registers are supplied for use in the second stage, only when real and imaginary components of new first and second difference terms, as the first and second outputs from the first stage supplied to the first and second registers, have values lower than values of real and imaginary components of any other first and second difference terms previously supplied to the first and second registers, respectively.

In one alternative, the minimum cumulative distance metric may be a Euclidean distance metric.

In one alternative, the predictor functions $g_1$ and $g_2$, respectively, may indicate first and second determinations of whether the values of the real and imaginary components of the any other first and second difference terms are greater or less than the values of the real and imaginary components of the new first and second difference terms, respectively.

In one alternative, the second stage may include: first and second multiplier operations to which the third and fourth outputs are supplied, respectively; and an adder operation to which fifth and sixth outputs of the first and second multiplier operations are supplied, respectively.

In one alternative, based on the control signal, in the second stage, the first and second multiplier operations may be performed only on, as the third and fourth outputs, a symbol sequence expected to generate a new minimum cumulative distance metric as an output of the adder operation.

In one alternative, a term associated with MIMO decoding which is common for all determinations of symbol sequence distance performed in the second stage may be external to the first and second logical AND operations.

In one alternative, the control signal may be supplied as a latch enable (LE) signal for the first and second registers.

In one alternative, the first and second outputs from the first stage may be generated, respectively, by first and second subtraction operations in the first stage.

In accordance with an aspect of the present invention, an apparatus for multiple input multiple output (MIMO) decoding may include circuitry configured to determine a minimum cumulative distance metric for decoding a symbol used in MIMO wireless communication. The circuitry may include first stage circuitry and second stage circuitry, and further include: a first logical AND gate for combining a first predictor function ($g_1$) with a second predictor function ($g_2$) to obtain an output (g), a second logical AND gate for combining the output (g) which is inverted, with an output of an input validity register to which a signal indicating validity of input is supplied, to obtain a control signal, and first and second registers for receiving first and second outputs from the first stage circuitry and supplying, based on the control signal, third and fourth outputs for use in the second stage circuitry, only when real and imaginary components of new first and second difference terms, as the first and second outputs from the first stage circuitry supplied to the first and second registers, have values lower than values of real and imaginary components of any other first and second difference terms previously supplied to the first and second registers, respectively.

In one alternative of the apparatus, the minimum cumulative distance metric may be a Euclidean distance metric.

In one alternative of the apparatus, the predictor functions $g_1$ and $g_2$, respectively, may indicate first and second determinations of whether the values of the real and imaginary components of the any other first and second difference terms are greater or less than the values of the real and imaginary components of the new first and second difference terms, respectively.

In one alternative of the apparatus, the second stage circuitry may include first and second multipliers to which the third and fourth outputs are supplied, respectively; and an adder to which fifth and sixth outputs of the first and second multipliers are supplied, respectively.

In one alternative of the apparatus, based on the control signal, the first and second multipliers may operate only on, as the third and fourth outputs, a symbol sequence expected to generate a new minimum cumulative distance metric as an output of the adder.

In one alternative of the apparatus, a term associated with MIMO decoding which is common for all determinations of symbol sequence distance performed in the second stage circuitry may be external to operations of the first and second logical AND gates.

In one alternative of the apparatus, the control signal may be supplied as a latch enable (LE) signal for the first and second registers.

In one alternative of the apparatus, the first and second outputs from the first stage circuitry may be generated, respectively, by first and second subtractors in the first stage circuitry.

In accordance with an aspect of the present invention, a wireless communication device may include a receiver to receive a multiple input multiple output (MIMO) wireless communication signal; and circuitry configured to determine a minimum cumulative distance metric for decoding a symbol in the MIMO wireless communication signal. The circuitry may include first stage circuitry and second stage circuitry, and further include: a first logical AND gate for combining a first predictor function ($g_1$) with a second predictor function ($g_2$) to obtain an output (g), a second logical AND gate for combining the output (g) which is inverted, with an output of an input validity register to which a signal indicating validity of input is supplied, to obtain a control signal, and first and second registers for receiving first and second outputs from the first stage circuitry and supplying, based on the control signal, third and fourth outputs for use in the second stage circuitry, only when real and imaginary components of new first and second difference terms, as the first and second outputs from the first stage circuitry supplied to the first and second registers, have values lower than values of real and imaginary components of any other first and second difference terms previously supplied to the first and second registers, respectively.

In one alternative of the device, the predictor functions $g_1$ and $g_2$, respectively, may indicate first and second determinations of whether the values of the real and imaginary components of the any other first and second difference terms are greater or less than the values of the real and imaginary components of the new first and second difference terms, respectively.

In one alternative of the device, the second stage circuitry may include first and second multipliers to which the third and fourth outputs are supplied, respectively; and an adder to which fifth and sixth outputs of the first and second multipliers are supplied, respectively. In a further alternative of the device, based on the control signal, the first and second multipliers may operate only on, as the third and fourth outputs, a symbol sequence expected to generate a new minimum cumulative distance metric as an output of the adder.

In one alternative of the device, a term associated with MIMO decoding which is common for all determinations of symbol sequence distance performed in the second stage circuitry may be external to operations of the first and second logical AND gates.

BRIEF DESCRIPTION OF THE DRAWINGS

Figure 4:
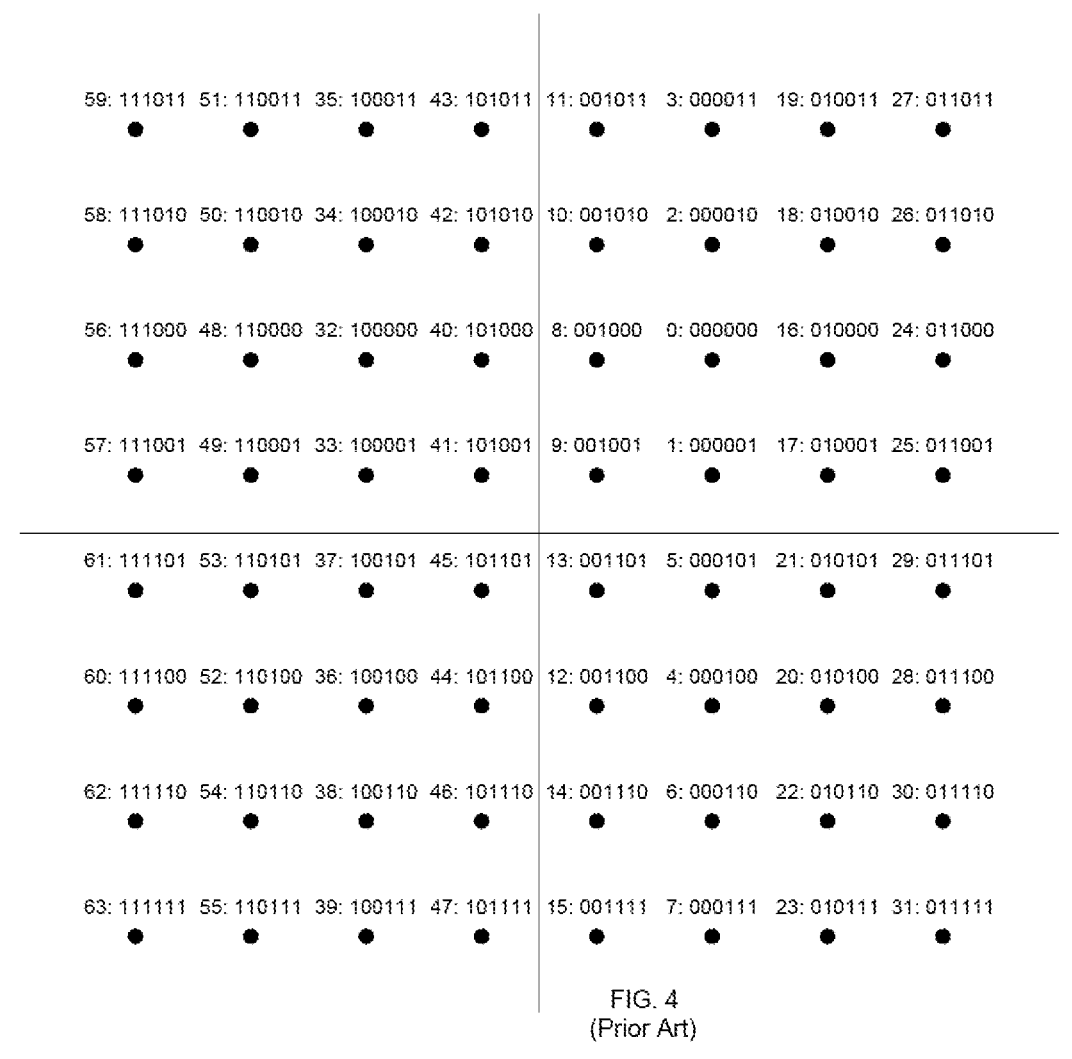

FIG. 4 illustrates the constellation of 64-QAM, which may be employed with aspects of the invention described herein.

DETAILED DESCRIPTION

Figure 1:
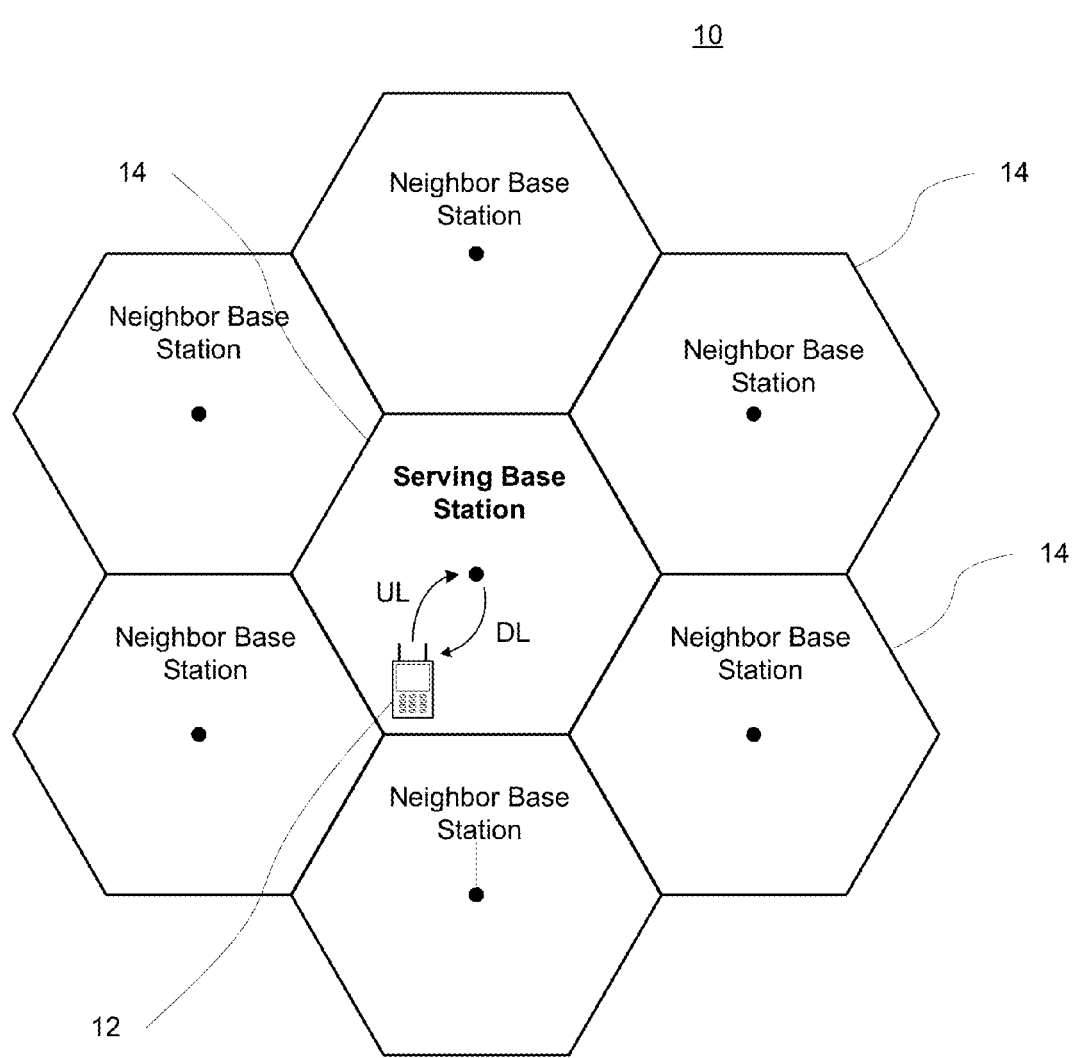
FIG. 1 illustrates a conventional mobile wireless communication system.
Figure 2:
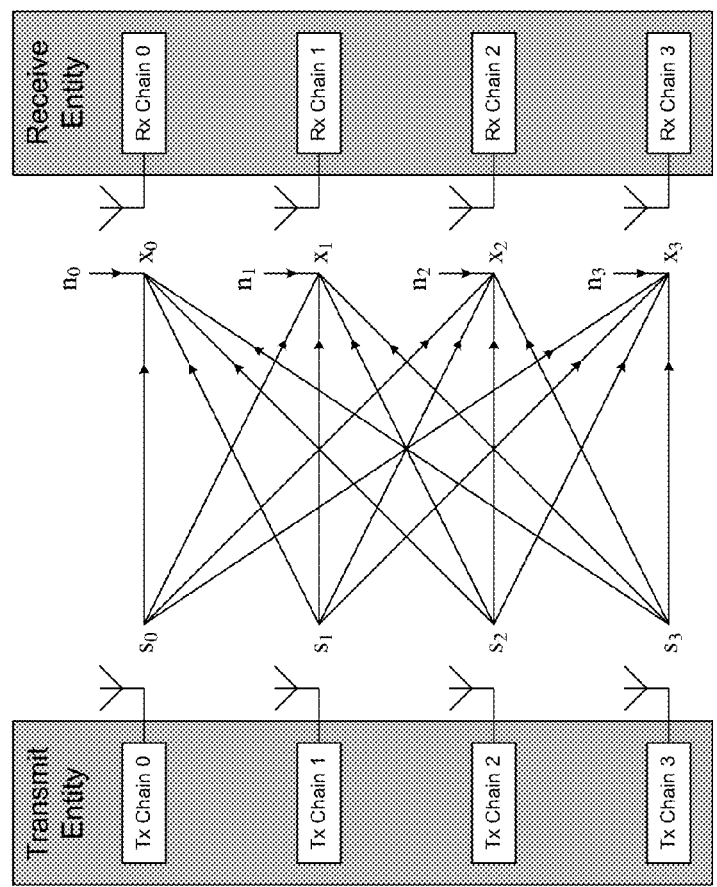
FIG. 2 illustrates an example of a SM-MIMO wireless communication system with four transmit chains at the transmit entity and four receive chains at the receive entity, which may be employed with aspects of the invention described herein.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the aspects of the invention are not intended to be limited to the specific terms used.

To illustrate the aspects of the invention, EQ. (15) is expanded for the case of 2×2 MIMO as follows:

$$\begin{bmatrix} y_0 \\ y_1 \end{bmatrix} = \begin{bmatrix} r_{0,0} & r_{0,1} \\ 0 & r_{1,1} \end{bmatrix} \begin{bmatrix} s_0 \\ s_1 \end{bmatrix} + \begin{bmatrix} n_0 \\ n_1 \end{bmatrix} \quad (19)$$

For the first stage distance computations in EQ. (19), the last row corresponding to a single non-zero entry in the matrix R is evaluated for all possible values of $s_1$ from the constellation using the following distance metric computation:

$$D_{s1} = \|y_1 - r_{1,1} s_1\|^2 \quad (20)$$

Figure 3:
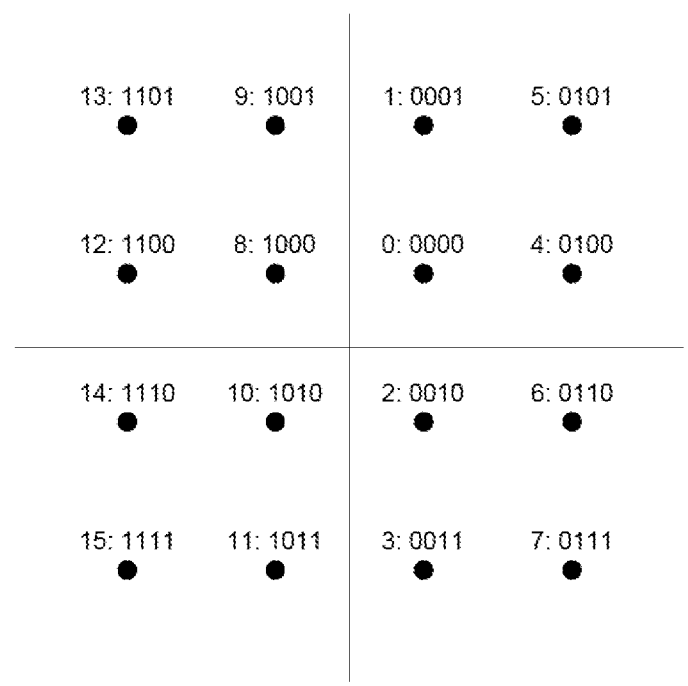
FIG. 3 illustrates the constellation of 16-QAM, which may be employed with aspects of the invention described herein.
Figure 5:
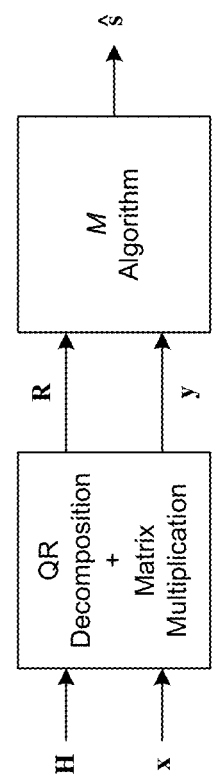
FIG. 5 illustrates a QRD-M SM decoder.
Figure 6:
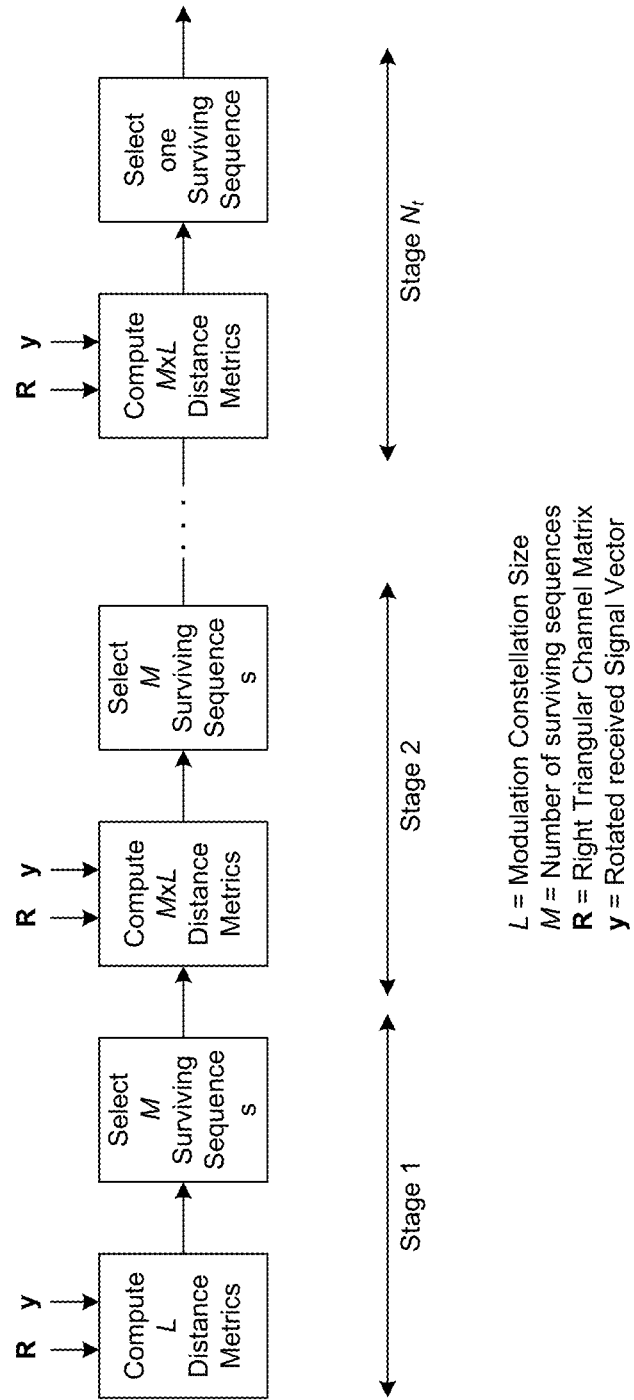
FIG. 6 illustrates the general processing flow diagram of the M-algorithm.
Figure 7A:
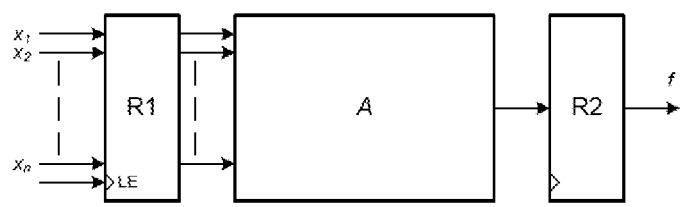
FIGS. 7(a)-7(b) illustrate the first computation architecture which may be employed with aspects of the invention described herein.
Figure 7B:
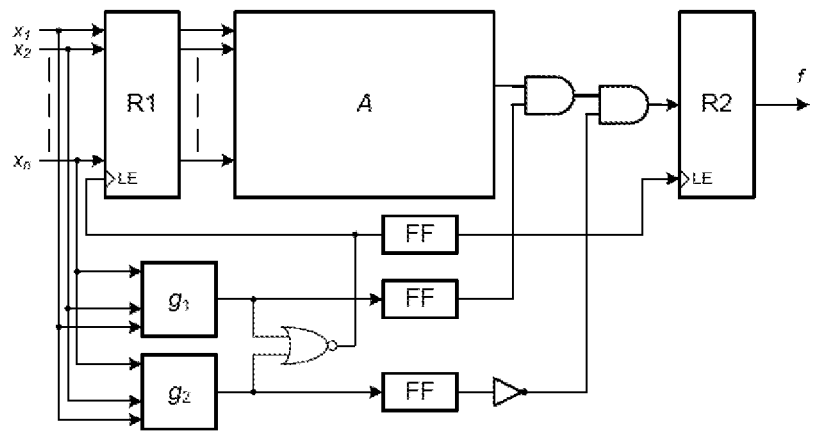

The terms $y_1$ and $r_{1,1}$ are complex and in general can have any value within the specified bit width for a given variable. The modulation symbol $s_1$ is chosen from a fixed set of constellation symbols. For example, from FIG. 3, in case of 16-QAM there are only 16 different values a symbol can take.

To select M minimum distance metrics from the first stage, at the end of each distance computation cycle a comparison needs to be performed with the set of current minimum values. It is also necessary to assign each symbol a unique index which is required to identify the symbol carried over to the second stage. Since the computation in EQ. (20) can be independently carried out, multiple distance computation blocks can be employed taking advantage of parallelism. Finally, M survivor symbols corresponding to M least distance metrics are carried over to the second stage.

For the second stage distance computations, in EQ (19), the M selected symbols from first stage corresponding to $s_1$ are substituted one at a time into the EQ. (21). The EQ. (21) is then evaluated for all possible values of so from the constellation. The cumulative distance metric ($D_{s1} + D_{s0}$) is used to determine the transmitted symbol sequence ($s_0, s_1$).

$$D_{s0} = \|y_0 - r_{0,0} s_0 - r_{0,1} s_1\|^2 \quad (21)$$

The terms $y_0$ and $r_{1,1}$ are complex and in general can have any value within the specified bit width for a variable. The modulation symbol $s_0$ is chosen from fixed set of values as discussed in previous section. The term $r_{0,0}$ is real based on QR decomposition. For each symbol $s_1$, e.g., ($r_{0,1} s_1$), and all possible values $s_0$, distance metric $D_{s0}$ has to be computed. The term $r_{0,1} s_1$ has to be computed only M times. Each value of $r_{0,1} s_1$ can be reused with all possible values of ($r_{0,0} s_0$). For example, in case of 64-QAM, term ($r_{0,1} s_1$) is to be computed M times and is used in EQ. (21) for 512 times. The QRD-M algorithm has fixed complexity regardless of the channel environment due to the constant selection of survival branches at each stage. The computation complexity for a 2×2 MIMO case is defined by the number of times EQ. (20) and EQ. (21) are evaluated. Therefore the parameters which determine the complexity of the QRD-M algorithm are the number of antennas at the transmitter, the number of survival symbols to each stage, and modulation scheme.

Figure 8:
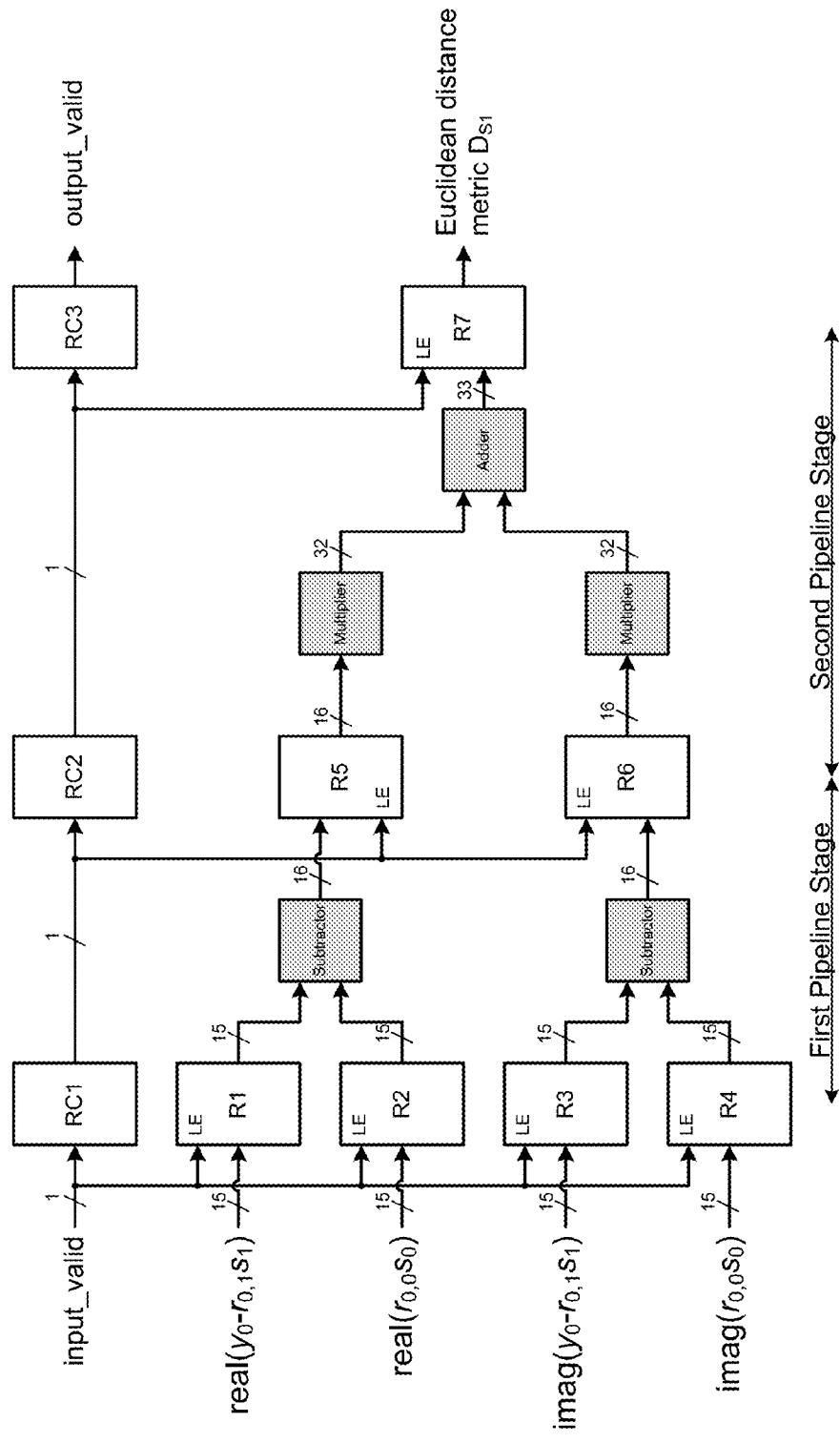
FIG. 8 illustrates the distance computation unit for a QRD-M decoder.

FIG. 8 illustrates the block for Euclidean distance computation defined by EQ. (21) in a conventional manner. The distance computation block is structured to have two pipelined stages. This is primarily done to keep the critical path delay limited to a Multiply-Accumulate (MAC) computation unit located in the second pipeline stage which allows the design to operate at higher clock speeds. At the input of the first pipeline stage, the real and imaginary components of the term ($y_0 - r_{0,1} s_1$) and the term ($r_{0,0} s_0$) are provided. In the present example, each of the real and imaginary components is represented with 15-bit resolution as indicated by width of the input bus in FIG. 8. The complex inputs ($y_0 - r_{0,1} s_1$) and ($r_{0,0} s_0$) are registered using the registers R1, R2, R3 and R4 where real and imaginary part of each are registered separately at the input of first pipeline stage. The first pipeline stage computes the real and imaginary components of the intermediate metric used for distance computation, i.e., ($y_0 - r_{0,1} s_1$) − ($r_{0,0} s_0$). The output of the first pipeline stage is registered using the registers R5 and R6 which becomes input to the second pipeline stage. The second pipeline stage performs the square of the intermediate metric and accumulates the contribution from real and imaginary branches to compute the Euclidean distance metric $D_{s0}$. An active high signal indicating the validity of these inputs is connected to the Latch Enable (LE) inputs of R1, R2, R3, R4, and RC1 as shown in FIG. 8.

In clock cycle t, two real subtractors compute the value of R1−R2 and R3−R4 corresponding to the real and imaginary parts respectively for the term ($y_0 - r_{0,1} s_1$) in EQ. (21). The resulting intermediate metrics are registered in registers R5 and R6. In clock cycle t+1, the values present in registers R5 and R6 are squared using two real multipliers and are summed up using an adder. The output of the adder is registered in R7 and is available for external modules in clock cycle t+2. The bit-width of the signals increases after arithmetic operations as shown in FIG. 8. The input validity is passed through a delay chain of two registers RC1 and RC2. The outputs of these registers are used to enable first and second sections of the circuit respectively. The output of the register RC3 is used as a validity indication for the final output.

It is apparent that a similar structure of distance computation block is to be used for first stage distance computation defined by EQ. (20). The cumulative distance metric is computed by summing the distance metrics obtained from first stage ($D_{s1}$) and second stage ($D_{s0}$) distance computation blocks. The MIMO decoder decodes a symbol sequence using the minimum of all the cumulative distance metrics. Therefore the computed cumulative distance metric over all possible values of symbol sequence ($s_0, s_1$) is compared against each other to obtain the minimum distance metric which is utilized to decode the symbol.

The number of cumulative distance computations, which consume high power, is required to support high data rate applications. Most of these computations corresponding to a symbol sequence ($s_0, s_1$) do not yield minimum metric and the Euclidean distance computations for these symbol sequences may be eliminated. The aspects of the present invention provide a method and apparatus to eliminate the redundant distance computations which may result in reduced power consumption.

Figure 9:
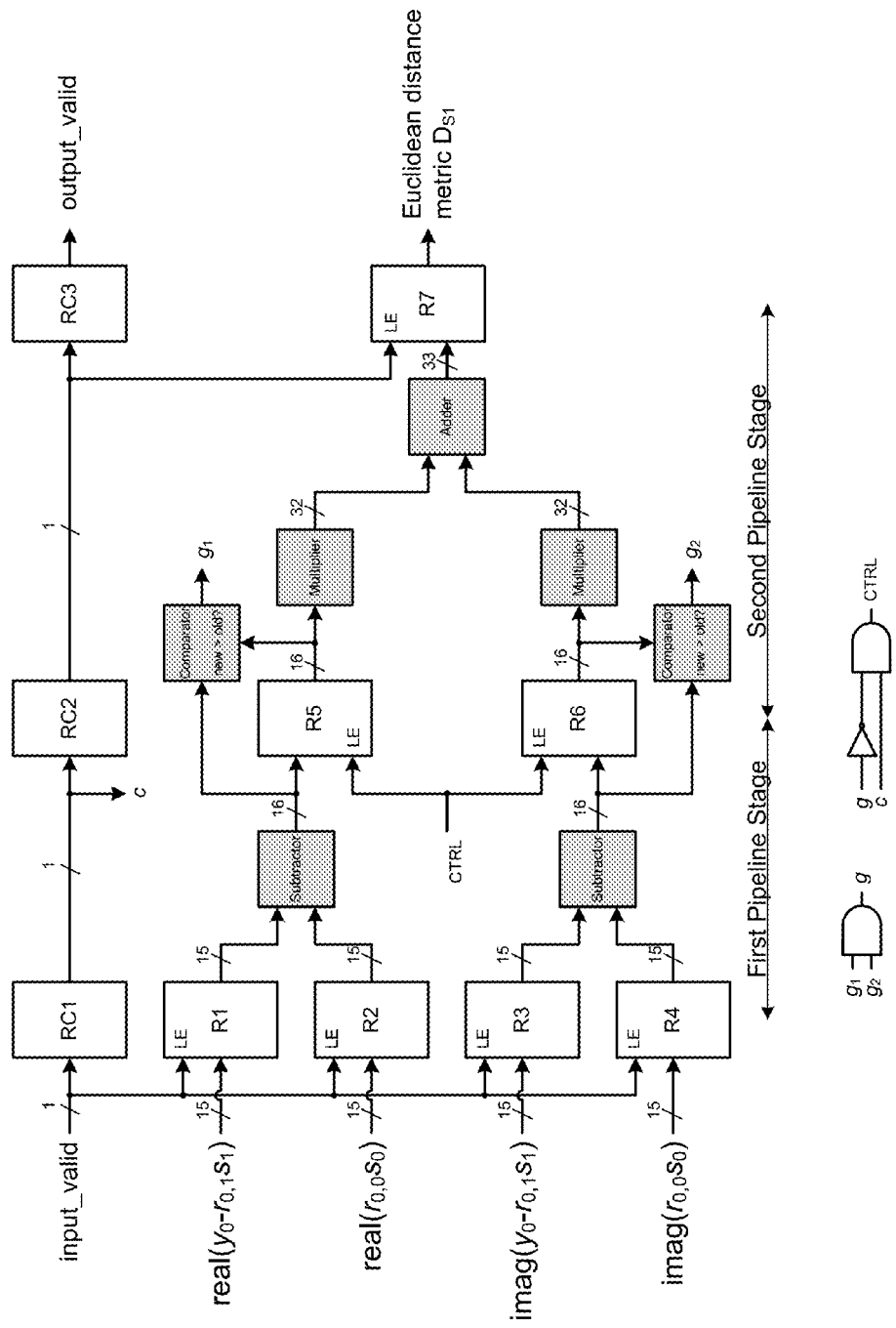
FIG. 9 illustrates the distance computation unit for a QRD-M decoder with the precomputation logic according to the aspects of the present invention.
Figure 10:
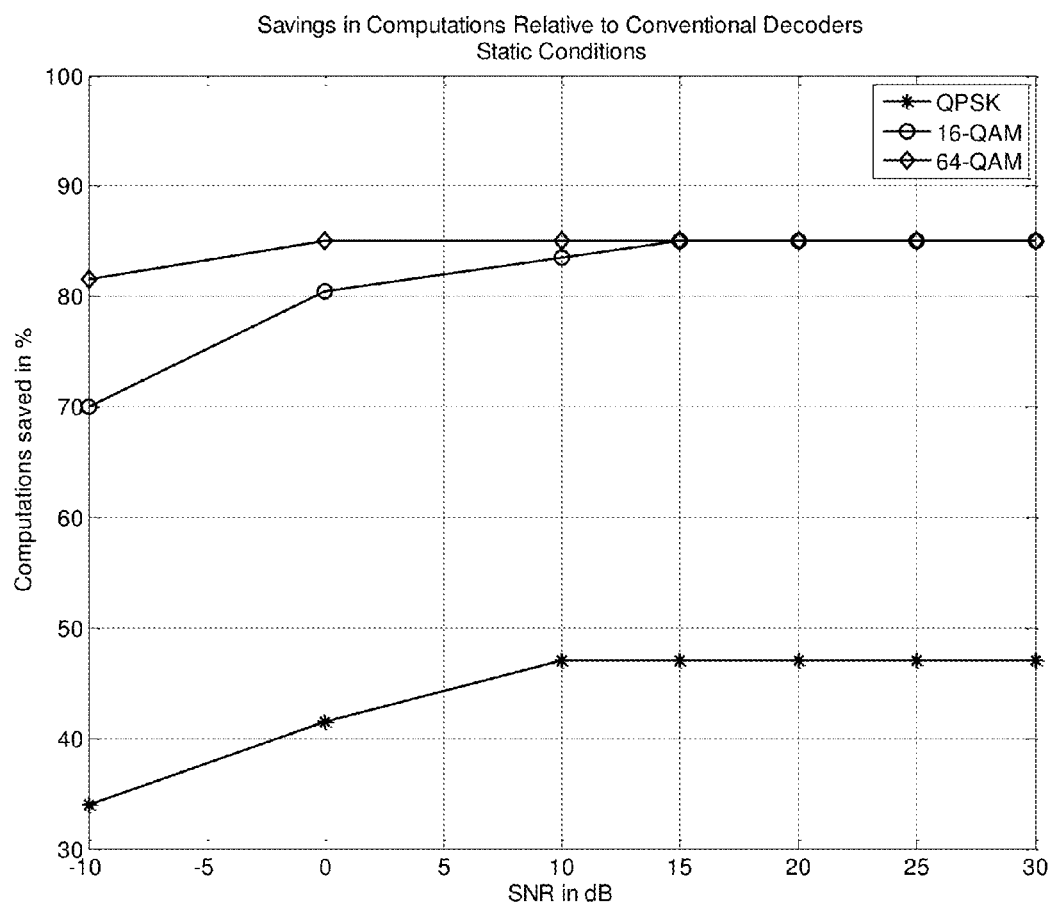
FIG. 10 illustrates the achievable saving in computation for different scenarios when distance computation logic is implemented according to the aspects of the present invention.

According to the aspects of the present invention, the MIMO decoder with disclosed precomputation logic block eliminates distance computations that are predicted, based on precomputation, to not yield minimum cumulative distance metric. A MIMO decoder with precomputation logic blocks $g_1$ and $g_2$ according to the aspects of the present invention is shown in FIG. 9. According to the aspects of the present invention, the precomputation logic block implements two predictor functions $g_1$ and $g_2$ which control the inputs to the second pipeline stage of distance computation block. The predictor functions $g_1$ and $g_2$ determine whether the real and imaginary components of the previously computed difference term ($y_0 - r_{0,1} s_1$) − ($r_{0,0} s_0$) are greater or less than the newly computed difference term at the input of the registers R5 and R6. According to the aspects of the present invention, since the term $r_{0,0} s_0$ is common for all the second stage distance computations, it is not a factor in precomputation logic. This simplifies the implementation of the predictor functions $g_1$ and $g_2$. The output $g_1$ and $g_2$ predictor functions are combined using logical AND gate to produce an output g as shown in FIG. 9. The output g is inverted and combined with the output of the register RC1 using logical AND gate to form a new Latch Enable (LE) signal CTRL for the registers R5 and R6. Therefore, the output of the registers R5 and R6 only change when the real and imaginary components of the new difference term at the input of the registers R5 and R6 are lower than their lowest value observed so far. Hence, according to the aspects of the present invention, the multiplications and addition operations in distance computation block are performed only on those sequence of symbols which are expected to produce a new minimum cumulative distance metric. The power consumption is reduced as a result of reduced internal switching activity on the critical path of the block which includes two multipliers and an adder (the second pipeline stage). FIG. 10 shows the percentage reduction in the number of computations achieved by the use of the precomputation logic in distance computation block according to the aspects of the present invention compared to the conventional QRD-M decoder.

In FIG. 10 the performance is shown for the case of static channel conditions for different SNR points. In case of QPSK modulation at 0 dB SNR, the precomputation logic according to the aspects of the present invention saves 42% of the total computations required by a conventional QRD-M decoder, i.e., only 58% of the computations are required by the decoder according to the aspects of the present invention. In case of 16-QAM at 0 dB SNR, the precomputation logic according to the aspects of the present invention saves 81% of the total computations required by a conventional QRD-M decoder, i.e., only 19% of the computations are required by the decoder according to the aspects of the present invention. In case of 64-QAM at 0 dB SNR, the precomputation logic according to the aspects of the present invention saves 85% of the total computations required by a conventional QRD-M decoder, i.e., only 15% of the computations are required by the decoder according to the aspects of the present invention. The savings in computations remains high across the entire SNR operating range. The saving in QPSK modulation is less compared to the 16-QAM and 64-QAM because the number of total computations required for QPSK is relatively small. For higher order SM-MIMO systems, such as 4×4, 8×8, etc., the reduction in number of computation according to the aspects of the present invention may be further improved and may lead to further reduction in power consumption.

The method and apparatus disclosed in the aspects of the present invention may be used in any communication system that uses SM-MIMO. Examples of such communication systems include, but not limited to, are $3^{rd}$ Generation Partnership Project (3GPP) Long Term Evolution, 3GPP High Speed Packet Access plus (HSPA+), Wireless Local Area Network (WLAN), commonly known as Wi-Fi, based on IEEE 802.11 family of standards, Worldwide Interoperability for Microwave Access (WiMAX) based on IEEE 802.16 family of standards, power-line communication systems based on IEEE 1901 standard, etc. The present invention may be used for multi-user SM-MIMO also.

By way of example only, the above described method may be implemented in a receiver, e.g., a user device such as a wireless mobile station (MS) 12 as shown in FIG. 1.

Figure 11:
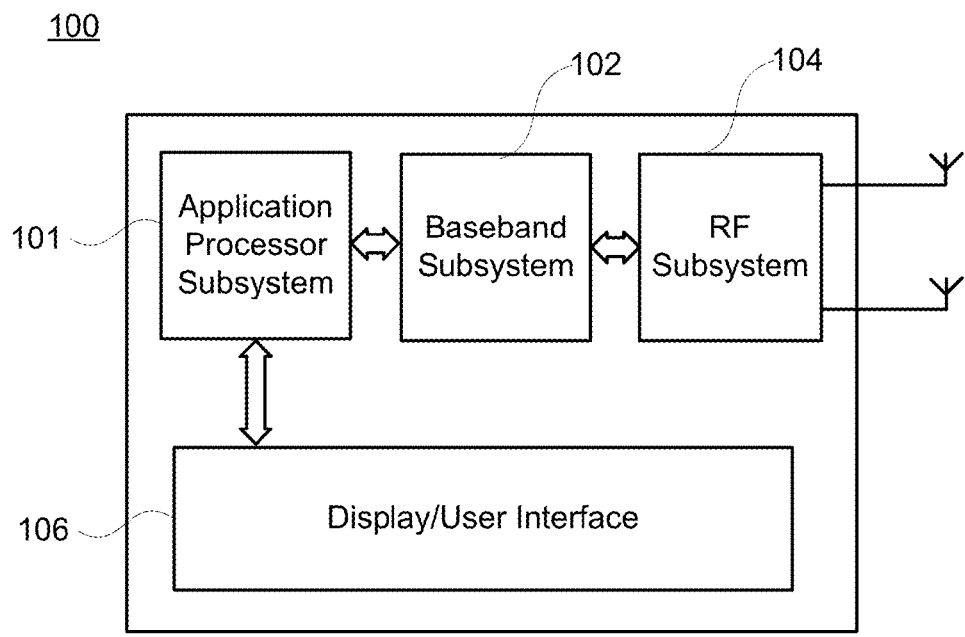
FIG. 11 illustrates a wireless mobile station diagram, which may be employed with aspects of the invention described herein.

As shown in FIG. 11, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 12:
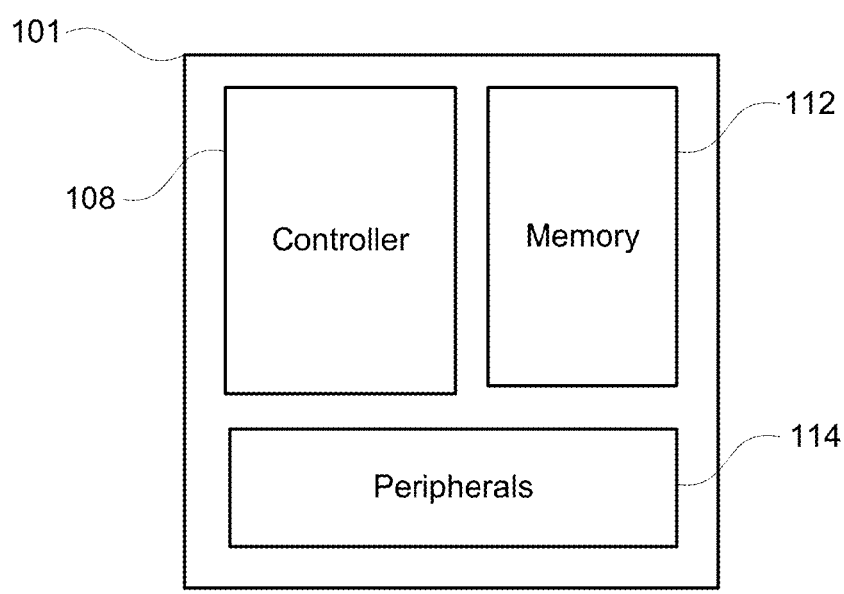
FIG. 12 illustrates an application processor subsystem for a wireless mobile station, which may be employed with aspects of the invention described herein.
Figure 13:
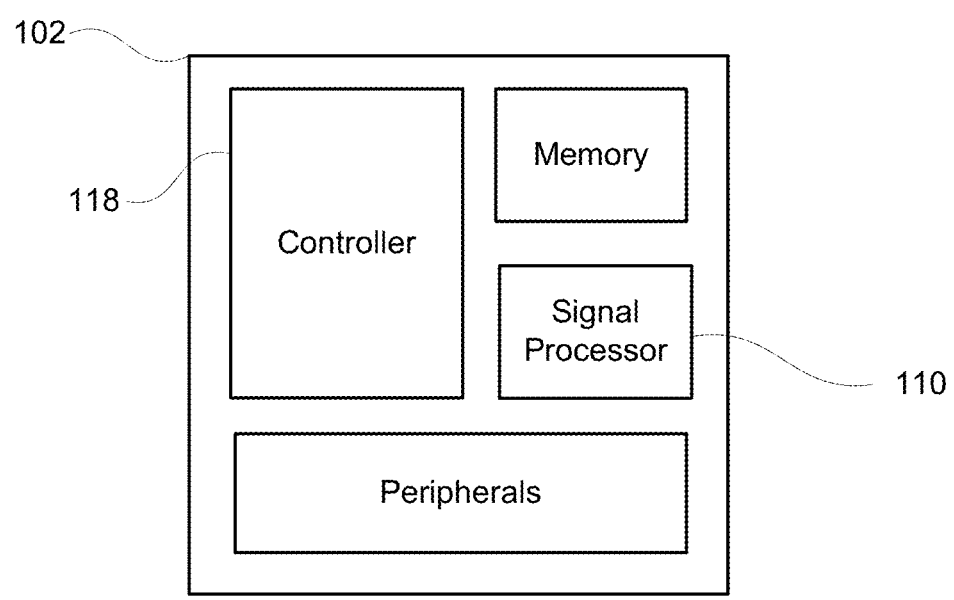
FIG. 13 illustrates a baseband subsystem for a wireless mobile station, which may be employed with aspects of the invention described herein.
Figure 14:
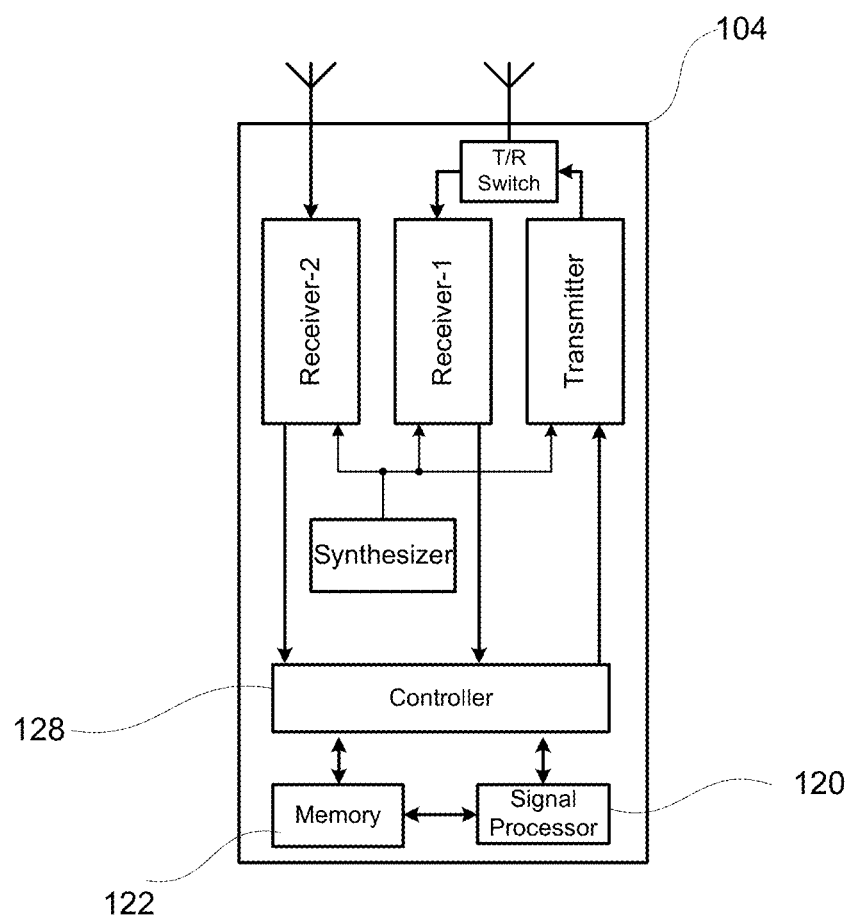
FIG. 14 illustrates an RF subsystem for a wireless mobile station, which may be employed with aspects of the invention described herein.

The application processor subsystem 101 as shown in FIG. 12 may include a controller 108 such as a microcontroller, another processor or other circuitry. The baseband subsystem 102 as shown in FIG. 13 may include a controller 118 such as a microcontroller or other processor. The RF subsystem 104 as shown in FIG. 14 may include a controller 128 such as a microcontroller, another processor or other circuitry. The controller 108 desirably handles overall operation of the MS 100. This may be done by any combination of hardware, software and firmware running on the controller 108. Such combination of hardware, software and firmware may embody any methods in accordance with the aspects of the present invention.

In FIG. 13 the peripherals 114 such as a full or partial keyboard, video or still image display, audio interface, etc., may be employed and managed through the controller 108.

Aspects of the present invention may be implemented in firmware of the controller 108 of the application processor and/or the controller 118 of the baseband subsystem as shown in FIG. 11. In another alternative, aspects of the present invention may also be implemented as a combination of firmware and hardware of the application processor subsystem 101 and/or the baseband subsystem 102. For instance, signal processing functionality of any or all of the FIG. 13 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for multiple input multiple output (MIMO) decoding comprising:
controlling, by a processing device, determining of a minimum cumulative distance metric for decoding a symbol used in MIMO wireless communication,
wherein the determining has a first stage and a second stage and includes:
combining a first predictor function ($g_1$) with a second predictor function ($g_2$) using a first logical AND operation to obtain an output (g),
combining the output (g) which is inverted, with an output of an input validity register to which a signal indicating validity of input is supplied, using a second logical AND operation to obtain a control signal, and controlling first and second registers, which are supplied, respectively, with first and second outputs from the first stage, with the control signal, such that third and fourth outputs respectively of the first and second registers are supplied for use in the second stage, only when real and imaginary components of new first and second difference terms, as the first and second outputs from the first stage supplied to the first and second registers, have values lower than values of real and imaginary components of any other first and second difference terms previously supplied to the first and second registers, respectively.

2. The method of claim 1, wherein the minimum cumulative distance metric is a Euclidean distance metric.

3. The method of claim 1, wherein the predictor functions $g_1$ and $g_2$, respectively, indicate first and second determinations of whether the values of the real and imaginary components of the any other first and second difference terms are greater or less than the values of the real and imaginary components of the new first and second difference terms, respectively.

4. The method of claim 1, wherein the second stage includes:
first and second multiplier operations to which the third and fourth outputs are supplied, respectively; and
an adder operation to which fifth and sixth outputs of the first and second multiplier operations are supplied, respectively.

5. The method of claim 4, wherein, based on the control signal, in the second stage, the first and second multiplier operations are performed only on, as the third and fourth outputs, a symbol sequence expected to generate a new minimum cumulative distance metric as an output of the adder operation.

6. The method of claim 1, wherein a term associated with MIMO decoding which is common for all determinations of symbol sequence distance performed in the second stage is external to the first and second logical AND operations.

7. The method of claim 1, wherein the control signal is supplied as a latch enable (LE) signal for the first and second registers.

8. The method of claim 1, wherein the first and second outputs from the first stage are generated, respectively, by first and second subtraction operations in the first stage.

9. An apparatus for multiple input multiple output (MIMO) decoding, the apparatus comprising:
circuitry configured to determine a minimum cumulative distance metric for decoding a symbol used in MIMO wireless communication, wherein the circuitry includes first stage circuitry and second stage circuitry,
wherein the circuitry further includes:
a first logical AND gate for combining a first predictor function ($g_1$) with a second predictor function ($g_2$) to obtain an output (g),
a second logical AND gate for combining the output (g) which is inverted, with an output of an input validity register to which a signal indicating validity of input is supplied, to obtain a control signal, and
first and second registers for receiving first and second outputs from the first stage circuitry and supplying, based on the control signal, third and fourth outputs for use in the second stage circuitry, only when real and imaginary components of new first and second difference terms, as the first and second outputs from the first stage circuitry supplied to the first and second registers, have values lower than values of real and imaginary components of any other first and second difference terms previously supplied to the first and second registers, respectively.

10. The apparatus of claim 9, wherein the minimum cumulative distance metric is a Euclidean distance metric.

11. The apparatus of claim 9, wherein the predictor functions $g_1$ and $g_2$, respectively, indicate first and second determinations of whether the values of the real and imaginary components of the any other first and second difference terms are greater or less than the values of the real and imaginary components of the new first and second difference terms, respectively.

12. The apparatus of claim 9,
wherein the second stage circuitry includes:
first and second multipliers to which the third and fourth outputs are supplied, respectively; and
an adder to which fifth and sixth outputs of the first and second multipliers are supplied, respectively.

13. The apparatus of claim 12, wherein, based on the control signal, the first and second multipliers operate only on, as the third and fourth outputs, a symbol sequence expected to generate a new minimum cumulative distance metric as an output of the adder.

14. The apparatus of claim 9, wherein a term associated with MIMO decoding which is common for all determinations of symbol sequence distance performed in the second stage circuitry is external to operations of the first and second logical AND gates.

15. The apparatus of claim 9, wherein the control signal is supplied as a latch enable (LE) signal for the first and second registers.

16. The apparatus of claim 9, wherein the first and second outputs from the first stage circuitry are generated, respectively, by first and second subtractors in the first stage circuitry.

17. A wireless communication device comprising:
a receiver to receive a multiple input multiple output (MIMO) wireless communication signal; and
circuitry configured to determine a minimum cumulative distance metric for decoding a symbol in the MIMO wireless communication signal, wherein the circuitry includes first stage circuitry and second stage circuitry,
wherein the circuitry further includes:
a first logical AND gate for combining a first predictor function ($g_1$) with a second predictor function ($g_2$) to obtain an output (g),
a second logical AND gate for combining the output (g) which is inverted, with an output of an input validity register to which a signal indicating validity of input is supplied, to obtain a control signal, and
first and second registers for receiving first and second outputs from the first stage circuitry and supplying, based on the control signal, third and fourth outputs for use in the second stage circuitry, only when real and imaginary components of new first and second difference terms, as the first and second outputs from the first stage circuitry supplied to the first and second registers, have values lower than values of real and imaginary components of any other first and second difference terms previously supplied to the first and second registers, respectively.

18. The device of claim 17, wherein the predictor functions $g_1$ and $g_2$, respectively, indicate first and second determinations of whether the values of the real and imaginary components of the any other first and second difference terms are greater or less than the values of the real and imaginary components of the new first and second difference terms, respectively.

19. The device of claim 17,
wherein the second stage circuitry includes:
first and second multipliers to which the third and fourth outputs are supplied, respectively; and
an adder to which fifth and sixth outputs of the first and second multipliers are supplied, respectively.

20. The device of claim 19, wherein, based on the control signal, the first and second multipliers operate only on, as the third and fourth outputs, a symbol sequence expected to generate a new minimum cumulative distance metric as an output of the adder.

21. The device of claim 17, wherein a term associated with MIMO decoding which is common for all determinations of symbol sequence distance performed in the second stage circuitry is external to operations of the first and second logical AND gates.

* * * * *